United States Patent
Lysdal et al.

(10) Patent No.: US 11,709,321 B2
(45) Date of Patent: *Jul. 25, 2023

(54) WAVELENGTH-SPLITTING OPTICAL CABLE

(71) Applicant: MELLANOX TECHNOLOGIES TLV LTD., Raanana (IL)

(72) Inventors: Henning Lysdal, Roskilde (DK); Barak Gafni, Campbell, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 6 days.

This patent is subject to a terminal disclaimer.

(21) Appl. No.: 17/503,314

(22) Filed: Oct. 17, 2021

(65) Prior Publication Data
US 2022/0043214 A1    Feb. 10, 2022

Related U.S. Application Data

(63) Continuation of application No. 16/662,089, filed on Oct. 24, 2019, now Pat. No. 11,169,330.

(51) Int. Cl.
*G02B 6/35* (2006.01)
*F21V 8/00* (2006.01)
*H04J 14/02* (2006.01)

(52) U.S. Cl.
CPC ......... *G02B 6/3548* (2013.01); *G02B 6/0026* (2013.01); *H04J 14/0209* (2013.01)

(58) Field of Classification Search
CPC .. G02B 6/3817; G02B 6/4201; G02B 6/4249; G02B 6/4416; G02B 6/4202;

(Continued)

(56) References Cited

U.S. PATENT DOCUMENTS 4,367,306 A    1/1983    Maeda et al.
4,869,672 A    9/1989    Andrews Jr.

(Continued)

FOREIGN PATENT DOCUMENTS

CN    205846322 U    12/2016

OTHER PUBLICATIONS

"Cisco 40GBASE QSFP+ Modules", Data sheet, pp. 1-7, Oct. 2012.

(Continued)

*Primary Examiner* — Ryan A Lepisto
*Assistant Examiner* — Erin D Chiem
(74) *Attorney, Agent, or Firm* — Kligler & Associates Patent Attorneys Ltd

(57) ABSTRACT

An optical cable includes a single optical connector configured for insertion into an optical receptacle so as to receive optical signals at a plurality of different wavelengths from the optical receptacle, and multiple electrical connectors, configured for insertion into respective electrical receptacles. Each electrical connector includes a transceiver configured to convert the optical signals into electrical output signals for output to an electrical receptacle. The optical cable further includes a plurality of optical fibers, having respective first ends connected together to the single optical connector so as to receive the optical signals. Each of the optical fibers has a respective second end coupled to a respective one of the electrical connectors. Wavelength selection optics are associated with the optical fibers so that the transceiver in each of the electrical connectors receives the optical signals at a different, respective one of the wavelengths.

20 Claims, 7 Drawing Sheets

(58) Field of Classification Search
CPC .. G02B 6/4246; G02B 6/4284; G02B 6/0026; G02B 6/12007; G02B 6/122; G02B 6/29311; G02B 6/3548; G02B 6/3668; G02B 6/38875; G02B 6/3888; G02B 6/3895; G02B 6/421; G02B 6/4214; G02B 6/4215; G02B 6/4221; G02B 6/4224; G02B 6/4225; G02B 6/423; G02B 6/428; G02B 6/4292; G02B 6/4295; G02B 6/4415; G02B 6/4467

See application file for complete search history.

(56) References Cited

U.S. PATENT DOCUMENTS

| | | | |
|---|---|---|---|
| 4,968,260 | A | 11/1990 | Ingalsbe |
| 4,993,972 | A | 2/1991 | Lin |
| 5,066,097 | A * | 11/1991 | Brandle ............... G02B 6/4249 385/100 |
| 5,087,207 | A | 2/1992 | Byrne |
| 5,277,591 | A | 1/1994 | Felcman et al. |
| 5,387,110 | A | 2/1995 | Kantner et al. |
| 5,664,950 | A | 9/1997 | Lawrence |
| 5,696,669 | A | 12/1997 | Bassler et al. |
| 5,734,558 | A | 3/1998 | Poplawski et al. |
| 5,766,020 | A | 6/1998 | Hughes |
| 5,788,521 | A | 8/1998 | Milan |
| 5,984,731 | A | 11/1999 | Laity |
| 6,183,307 | B1 | 2/2001 | Laity et al. |
| 6,183,308 | B1 | 2/2001 | Laity |
| 6,203,333 | B1 | 3/2001 | Medina et al. |
| 6,215,656 | B1 | 4/2001 | O'Neal et al. |
| 6,256,448 | B1 | 7/2001 | Shadid |
| 6,517,382 | B2 | 2/2003 | Flickinger et al. |
| 6,648,695 | B1 | 11/2003 | Wu |
| 6,773,291 | B1 | 8/2004 | Roth et al. |
| 6,814,593 | B2 | 11/2004 | Wang et al. |
| 6,816,376 | B2 | 11/2004 | Bright et al. |
| 7,028,202 | B2 | 4/2006 | Long et al. |
| 7,048,550 | B2 | 5/2006 | Hayland et al. |
| 7,335,033 | B1 | 2/2008 | Edwards, Jr. et al. |
| 7,380,993 | B2 | 6/2008 | Dallesasse |
| 7,452,139 | B2 | 11/2008 | Wang et al. |
| 7,494,287 | B2 | 2/2009 | Wang et al. |
| 7,747,292 | B2 | 6/2010 | Mezer et al. |
| 7,823,041 | B2 | 10/2010 | Mezer et al. |
| 7,934,959 | B2 | 5/2011 | Rephaeli et al. |
| 8,075,199 | B2 | 12/2011 | Losio et al. |
| 8,083,417 | B2 | 12/2011 | Aronson et al. |
| 8,419,444 | B2 | 4/2013 | Kagan et al. |
| 8,599,559 | B1 | 12/2013 | Morrison et al. |
| 8,641,429 | B2 | 2/2014 | Fish et al. |
| 8,944,704 | B2 | 2/2015 | Lagziel et al. |
| D734,728 | S | 7/2015 | Lagziel et al. |
| 9,793,667 | B1 | 10/2017 | Park et al. |
| 9,887,782 | B2 | 2/2018 | Hosking |
| 10,122,106 | B2 | 11/2018 | Regnier |
| 10,128,627 | B1 | 11/2018 | Kazav et al. |
| 10,276,995 | B2 | 4/2019 | Little |
| 10,444,453 | B1 | 10/2019 | Khamaisee et al. |
| 10,741,954 | B1 | 8/2020 | Ger et al. |
| 2001/0019907 | A1 | 9/2001 | Glad et al. |
| 2004/0013369 | A1 | 1/2004 | Coffey et al. |
| 2004/0023559 | A1 | 2/2004 | Wu |
| 2005/0254759 | A1 | 11/2005 | O'Brien |
| 2006/0088251 | A1* | 4/2006 | Wang ................... G02B 6/4201 385/101 |
| 2007/0232132 | A1 | 10/2007 | Ling et al. |
| 2007/0237464 | A1 | 10/2007 | Aronson et al. |
| 2007/0237472 | A1 | 10/2007 | Aronson et al. |
| 2008/0044141 | A1 | 2/2008 | Willis et al. |
| 2008/0069052 | A1 | 3/2008 | Mezer et al. |
| 2008/0150546 | A1 | 6/2008 | Gale |
| 2008/0249470 | A1 | 10/2008 | Malave et al. |
| 2008/0267620 | A1 | 10/2008 | Cole et al. |
| 2009/0060425 | A1 | 3/2009 | Aronson et al. |
| 2009/0061662 | A1 | 3/2009 | Chin |
| 2009/0093137 | A1 | 4/2009 | Badehi et al. |
| 2009/0093166 | A1 | 4/2009 | Fogg et al. |
| 2009/0232151 | A1 | 9/2009 | Furlong et al. |
| 2009/0247006 | A1 | 10/2009 | Thompson |
| 2010/0014566 | A1 | 1/2010 | Mezer et al. |
| 2011/0123157 | A1 | 5/2011 | Belsan et al. |
| 2012/0015552 | A1 | 1/2012 | Diab et al. |
| 2012/0141132 | A1 | 6/2012 | Walker |
| 2012/0264335 | A1 | 10/2012 | Feyder et al. |
| 2013/0071072 | A1 | 3/2013 | Xie |
| 2013/0251052 | A1 | 9/2013 | Tang et al. |
| 2015/0092363 | A1 | 4/2015 | Blier et al. |
| 2015/0147062 | A1 | 5/2015 | Otte |
| 2015/0282382 | A1 | 10/2015 | Nguyen |
| 2016/0006182 | A1 | 1/2016 | Patel |
| 2017/0005446 | A1 | 1/2017 | Regnier |
| 2017/0077643 | A1 | 3/2017 | Zbinden et al. |
| 2017/0139145 | A1 | 5/2017 | Heanue et al. |
| 2017/0153319 | A1* | 6/2017 | Villeneuve ............. G01S 17/06 |
| 2018/0259723 | A1 | 9/2018 | Mentovich et al. |
| 2019/0044299 | A1 | 2/2019 | Kazav et al. |
| 2019/0377147 | A1 | 12/2019 | Vilner |

OTHER PUBLICATIONS

International Electrotechnical Commission, Standard IEC-61754-7, "Fibre optic interconnecting devices and passive components—Fibre optic connector interfaces—Part 7: Type MPO connector family", Edition 3.0, pp. 1-32, Mar. 2008.

International Electrotechnical Commission, Standard IEC-61754-5, "Fibre optic connector interfaces—Part 5: Type MT connector family", Edition 2.0, pp. 1-32, Jul. 2005.

Mellanox Technologies, "Quad to Serial Small Form Factor Pluggable Adapter: Enabling VPI/40GigE Connectivity on 1/10GigE Infrastructure", p. 1-1, USA, 2010.

SFF Committee, "SFF-8431 Specifications for Enhanced Small Form Factor Pluggable Module SFP+", Revision 4.1, pp. 1-132, Jul. 6, 2009.

SFF Committee, "SFF-8436 Specification for QSFP+ Copper and Optical Modules", Revision 3.4, pp. 1-71, Nov. 12, 2009.

SFF Committee, "INF-8438i Specification for QSFP (Quad Small Formfactor Pluggable) Transceiver", Revision 1.0, pp. 1-75, Nov. 2006.

Barrass et al, "10GBASE-T: 10 Gigabit Ethernet over Twisted-pair Copper", Ethernet Alliance, Version 1.0, Austin, USA, pp. 1-44, Aug. 2007.

Aquantia Corporation, Quad 10GBASE-T Product Brief, Version 1.0, Milpitas, USA, pp. 1-2, Apr. 23, 2009.

IEEE Standard 802.3an-2006, "IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment 1: Physical Layer and Management Parameters for 10 Gb/s Operation, Type 10GBASE-T", pp. 1-181, Sep. 1, 2006.

Solarflare Communications, Inc., "Solarflare SFN5122F Dual-Port 10G Ethernet Enterprise Server Adapter", Product Brief, pp. 1-2, year 2011.

Teranetics—PLX Technology, Inc., "Dual-Speed 10GBase-T /1000 Base-T Ethernet Physical Layer Device", Product Brief, pp. 1-3, year 2010.

SFP-DD MSA, "SFP-DD Hardware Specification for SFP Double Density 2X Pluggable Transceiver", Revision 1.1, pp. 1-49, Jan. 7, 2018.

Cisco, "Cisco QSFP to SFP or SFP+ Adapter Module", pp. 1-3, Jun. 24, 2017.

Mellanox Technologies, "10Gb/s DynamiX QSATM QSFP+ to SFP+ Adapter", pp. 1-3, Feb. 8, 2018.

(56) References Cited

OTHER PUBLICATIONS

QSFP-DD MSA, "QSFP-DD Hardware Specification for QSFP Double Density 8X Pluggable Transceiver", Revision 3.0, pp. 1-69, Sep. 19, 2017.
OSFP "Frequently Asked Questions", pp. 1-2, May 15, 2017.

* cited by examiner

WAVELENGTH-SPLITTING OPTICAL CABLE

CROSS-REFERENCE TO RELATED APPLICATION

This application is a continuation of U.S. patent application Ser. No. 16/662,089, filed Oct. 24, 2019, which is incorporated herein by reference.

FIELD OF THE INVENTION

The present invention relates generally to opto-electronic devices, and particularly to active optical cables.

BACKGROUND

Data centers that handle large amounts of data commonly utilize high-capacity optical switch assemblies. These switch assemblies send and receive data to and from multiple servers in the form of optical signals with data rates reaching hundreds of Gb/s.

SUMMARY

Embodiments of the present invention that are described hereinbelow provide an improved optical cable, which can be used, for example, in connecting switching assemblies to servers.

There is therefore provided, in accordance with an embodiment of the present invention, an optical cable, which includes a single optical connector configured for insertion into an optical receptacle so as to receive optical signals at a plurality of different wavelengths from the optical receptacle. The optical cable includes multiple electrical connectors, configured for insertion into respective electrical receptacles. Each electrical connector includes a transceiver configured to convert the optical signals into electrical output signals for output to an electrical receptacle into which the electrical connector is inserted. The optical cable further includes a plurality of optical fibers, having respective first ends connected together to the single optical connector so as to receive the optical signals, and each of the optical fibers having a respective second end coupled to a respective one of the electrical connectors. Wavelength selection optics are associated with the optical fibers so that the transceiver in each of the electrical connectors receives the optical signals at a different, respective one of the wavelengths.

In a disclosed embodiment, the wavelength selection optics include a wavelength splitter in the single optical connector, such that each of the optical fibers receives and conveys the optical signals only at the respective one of the wavelengths. In one embodiment, the wavelength splitter includes an optical wavelength-division demultiplexer.

In a further embodiment, the wavelength selection optics include a wavelength selection filter associated with each of the multiple electrical connectors. The wavelength selection filter may include an optical bandpass filter. Alternatively, the wavelength selection optics includes an optical wavelength-division demultiplexer.

In another embodiment, the transceiver in each of the electrical connectors is further configured to convert an electrical input signal received from the electrical receptacle into a respective optical output signal. The optical fibers include fiber pairs, each pair including a first optical fiber configured to convey the optical signals from the single optical connector to the respective one of the electrical connectors and a second optical fiber configured to convey the optical output signal from the transceiver to the single optical connector. In a disclosed embodiment, each transceiver is configured to generate the respective optical output signal at a different, respective wavelength.

There is also provided, in accordance with an embodiment of the present invention, a method for producing an optical cable. The method includes providing an optical connector configured for insertion into an optical receptacle so as to receive optical signals at a plurality of different wavelengths from the optical receptacle, and providing multiple electrical connectors configured for insertion into respective electrical receptacles. Each electrical connector includes a transceiver configured to convert the optical signals into electrical output signals for output to an electrical receptacle into which the electrical connector is inserted. Respective first ends of a plurality of optical fibers are connected together to the single optical connector so as to receive the optical signals. A respective second end of each of the optical fibers is connected to a respective one of the electrical connectors. Wavelength selection optics are associated with the optical fibers so that the transceiver in each of the electrical connectors receives the optical signals at a different, respective one of the wavelengths.

There is also provided, in accordance with an embodiment of the present invention, a method for networking, which includes providing an optical cable including a single optical connector configured to receive optical signals at a plurality of different wavelengths, and multiple electrical connectors. Each electrical connector includes a transceiver configured to convert the optical signals into electrical output signals. The optical cable further includes a plurality of optical fibers, having respective first ends connected together to the single optical connector, while each of the optical fibers has a respective second end coupled to convey the optical signals at a respective one of the wavelengths to a respective one of the electrical connectors. The single optical connector is inserted into an optical receptacle in a network hub, and the electrical connectors are inserted into respective electrical receptacles of multiple, different network nodes.

The present invention will be more fully understood from the following detailed description of the embodiments thereof, taken together with the drawings in which:

DETAILED DESCRIPTION OF EMBODIMENTS

Figure 1:
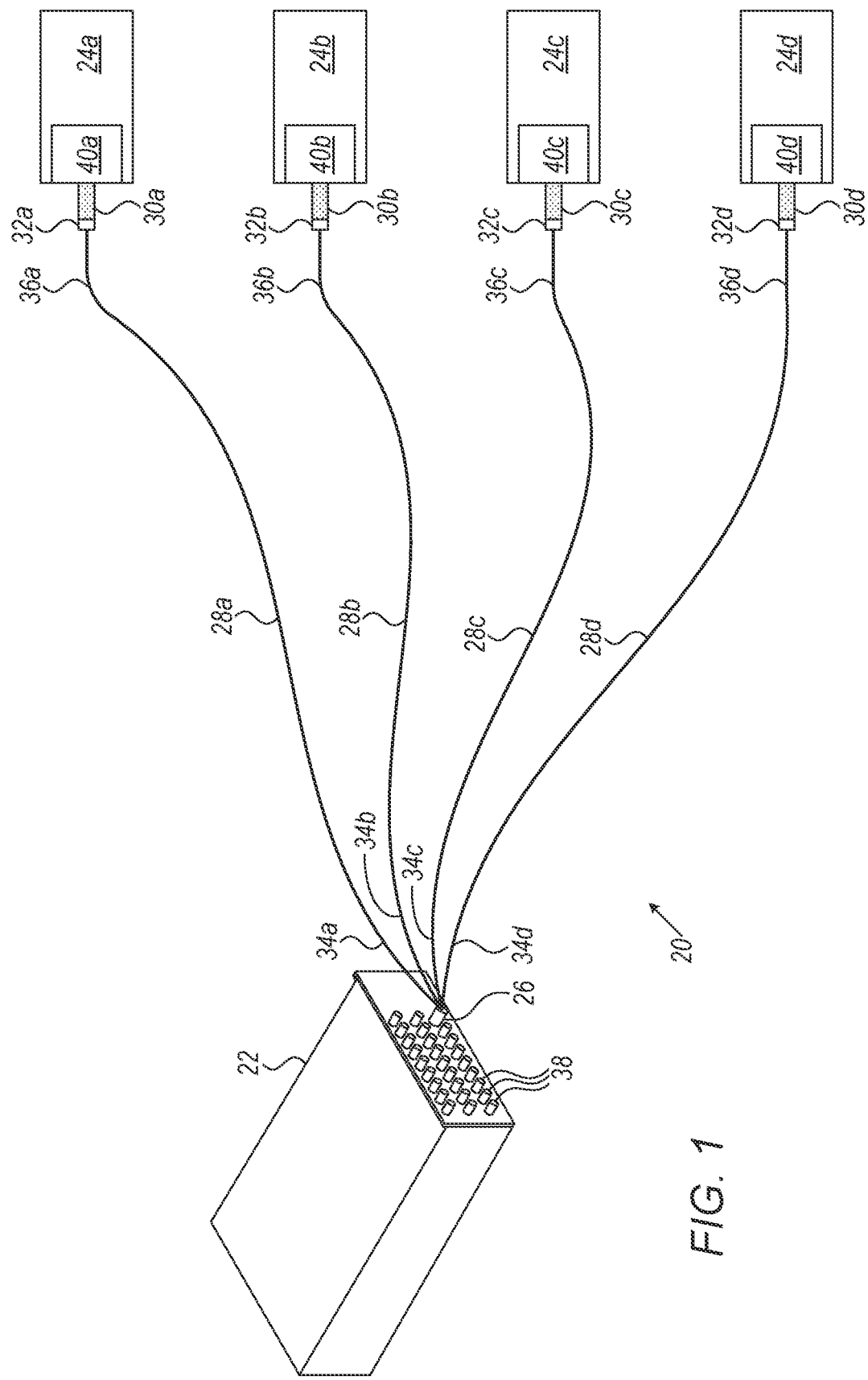
FIG. 1 is a schematic pictorial illustration of an active optical cable connecting a switch assembly to four servers, in accordance with an embodiment of the invention.

Overview High-capacity optical switch assemblies switch multiple channels of data at high data rates, with the number of channels reaching several hundreds and data rates reaching hundreds of Gb/s (Gb/s=$10^9$ bits per second). In order to save power, it is desirable to co-package the switch itself with "optical engines," which typically are small, high-density optical transceivers located within an application-specific integrated circuit (ASIC) or within an ASIC package together with the switch.

The switch assembly is contained in a rack-mounted case, with optical receptacles on its front panel for ease of access. The signals from and to the ASIC are conveyed to and from the optical receptacles using optical fibers.

Space constraints of the switch and the front panel limit the number of optical fibers connected to the ASIC and optical receptacles on the panel. Therefore, the optical signals emitted and received by the switch are multiplexed using wavelength-division multiplexing, so that each fiber, along with the associated optical receptacle, carries multiple optical signals. For example, each fiber may carry four channels of 100 Gb/s each, at four different, respective wavelengths, to and from the corresponding optical receptacle, for a total data rate of 400 Gb/s (denoted as 4×100 Gb/s).

In many cases, the multiple communication channels carried at different wavelengths on the same fiber are directed to and from different network nodes. For example, each of the 100 Gb/s component signals on a 4×100 Gb/s optical link may be directed to a different server. Therefore, there is a need for an optical cable that is capable of splitting the multiplexed optical signal into multiple component signals at different, respective wavelengths, and be capable of conveying each of these signals to a different network node. For simplicity of installation and use, it is desirable that the optical cable be "active," meaning that transceivers in the cable convert each of the multiple optical signals to a standard electrical form (and vice versa). As a result, the network nodes need process only electrical signals and will be indifferent to the actual wavelength of the optical channel that is directed to each of them.

The embodiments of the present invention that are described herein address the above needs by providing a simple, active optical cable that is easy to connect to a wavelength-multiplexed hub, such as a high-speed switch, at one end, and that provides respective electrical signals to multiple nodes, such as servers, at the other end. The active optical cable incorporates a passive optical splitter at the wavelength-multiplexed end and transceivers at the multiple ends connected to the network nodes. Wavelength selection optics within the cable between the wavelength-multiplexed end and the transceivers direct each of the multiplexed wavelengths to a different transceiver.

In the disclosed embodiments, the optical cable comprises multiple optical fibers, a single optical connector, multiple electrical connectors (one for each of the optical fibers), and wavelength selection optics. The optical connector is configured for insertion into an optical receptacle, such as on a switch assembly, so as to receive optical signals at multiple different wavelengths from the receptacle. The multiple electrical connectors are configured for insertion into electrical receptacles, such as on respective servers. Each electrical connector comprises a transceiver that converts the received optical signals into electrical output signals for output to the electrical receptacle into which the electrical connector is inserted. The optical fibers have their respective first ends connected together to the single optical connector so as to receive the optical signals, and each of the optical fibers has its respective second end coupled to an electrical connector. The wavelength selection optics are associated with the optical fibers so that the transceiver in each of the electrical connectors receives the optical signals at a different wavelength.

Thus, as in the previously described example, an optical signal comprising four 100 Gb/s signals at four different wavelengths (4×100 Gb/s) can be conveyed from one optical receptacle of a switch assembly to four electrical server receptacles. This is accomplished by connecting the active optical cable between the optical receptacles of the switch assembly and electrical receptacles of the servers. The active optical cable comprises four optical fibers joined together at their respective first ends at a single optical connector, whereas each of the four second ends of the fiber is connected to a separate electrical connector. Within the optical connector, the first ends are joined using, for example, a standard, spectrally non-selective 1-to-4 waveguide splitter. Each second end is connected via wavelength selection optics (for example, a bandpass filter or a wavelength-division demultiplexer) to a transceiver within the electrical connector.

Alternatively, the wavelength selection optics may comprise a 1-to-4 wavelength-specific splitter (for example, a wavelength-division demultiplexer) within the optical connector, and each second end is connected directly to a transceiver without a need for additional wavelength selection optics.

The optical connector receives the multi-channel optical signal from the optical receptacle. In embodiments in which the optical splitter has no selectivity with respect to wavelength, the optical signal is split among the multiple fibers so that each fiber carries all of the optical signals at the multiple wavelengths. The wavelength selection optics in each fiber have a different, respective passband, so that each transceiver receives only the optical signal at its own, assigned wavelength. The transceiver converts this optical signal to an electrical signal for output to the electrical receptacle. Alternatively, when the optical splitter is a wavelength-specific splitter, each of the multiple fibers carries a signal at a different, respective wavelength directly to a transceiver.

Having an active optical cable with only one optical connector for a signal with multiple wavelengths simplifies the task of a technician connecting the cable: He/she only needs to ascertain that the optical connector is connected to the correct optical receptacle at one end of the cable, and the correct electrical receptacles at the other end, without having to be concerned with the wavelengths carried by the cable. Furthermore, having one active optical cable for multiple wavelengths reduces the inventory and the cost of cabling.

Although the description above, for the sake of simplicity, refers mainly to transmission of signals from a hub to multiple network nodes, in common embodiments of the present invention, the active optical cable is configured for transmitting wavelength-multiplexed signals in two directions between the hub and the nodes. In such embodiments, the transceiver is configured to convert a received electrical signal from the electrical receptacle into an optical output signal at an assigned wavelength, as well as converting the received optical signal into an electrical signal as described above. In such embodiments, the optical fibers comprise four fiber pairs (rather than four single fibers). The first optical fiber of the pair conveys the optical signals from the single optical connector to the respective electrical connector. The second optical fiber conveys the optical output signal from the respective electrical connector to the single optical connector, where all four second optical fibers are joined together by an optical joiner (for example, an optical splitter configured to function in reverse), thereby generating a wavelength-multiplexed input to the optical receptacle of the hub.

In these bidirectional embodiments, each of the four transceivers is typically configured to emit an optical signal at the same wavelength as the signal it received. Alternatively, each of the transceivers may emit at another wavelength, as long as each wavelength is emitted by only one of the transceivers, so that the hub is able to distinguish between the signals from the different transceivers.

First Embodiment

FIG. 1 is a schematic pictorial illustration of an active optical cable 20 connecting a switch assembly 22 to four servers 24a, 24b, 24c, and 24d, in accordance with an embodiment of the invention. In the described embodiment, as well as those following, a connection to four servers of four 100 Gb/s signals (4×100 Gb/s) is again used as an example. Other numbers of servers and signals, such as 2, 3, 5, 6, or even higher, as well as other data rates, may be used in alternative embodiments. Furthermore, active optical cables of the sort in accordance with embodiments of the invention may be used not only in this sort of connections between switches and servers, but also in other applications in which network nodes are connected using optical wavelength multiplexing.

Figure 6:
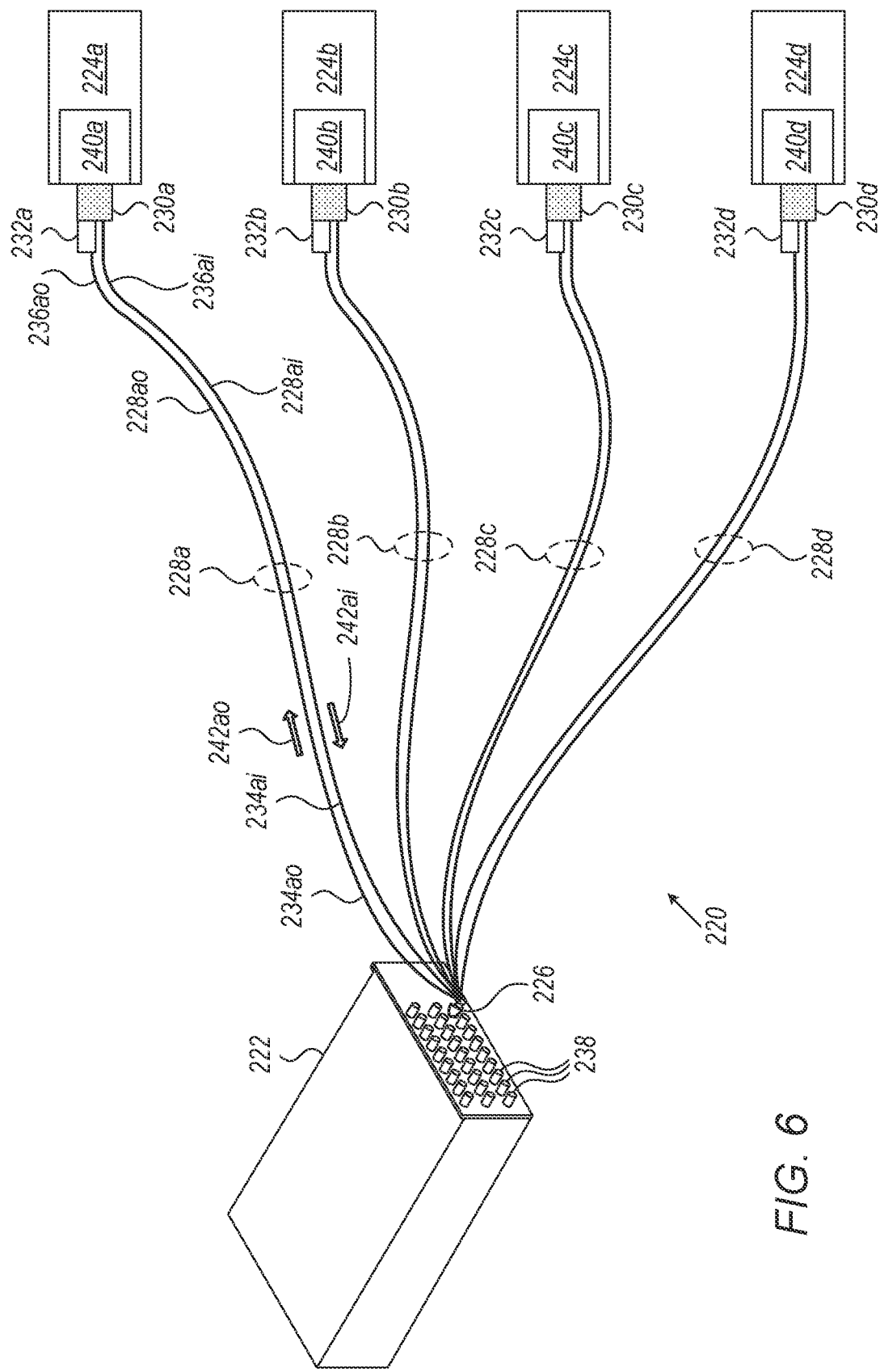
FIG. 6 is a schematic pictorial illustration of an active optical cable connecting a switch assembly to four servers, in accordance with yet another embodiment of the invention.

Active optical cable 20 comprises a single optical connector 26 (detailed further in FIG. 2), four optical fibers 28a, 28b, 28c, and 28d, four electrical connectors 30a, 30b, 30c, and 30d (detailed further in FIG. 3), and four wavelength selection optics 32a, 32b, 32c, and 32d. (In this simplified example, only one-way communication is described; but in practical applications, the active optical cable may comprise eight optical fibers for two-way four-channel communication, for example as is shown in FIG. 6). Each optical fiber 28a . . . 28d comprises a respective first end 34a, 34b, 34c, and 34d and a respective second end 36a, 34b, 34c, and 36d. First ends 34a . . . 34d are connected together to optical connector 26, and second ends 36a . . . 36d are connected to respective electrical connectors 30a . . . 30d via respective wavelength selection optics 32a . . . 32d, as detailed further in FIGS. 2 and 3.

Switch assembly 22 comprises many optical receptacles 38, for example 128 receptacles arranged in a rectangular 8×16 matrix. The number of optical receptacles, as well as their arrangement in a matrix form, are used as an example only.

Each server 24a . . . 24d comprises a respective electrical receptacle 40a, 40b, 40c, and 40d.

Cable 20 (and similarly the other active optical cables described below) and connectors 26 and 30a . . . 30d may be designed to comply with any applicable standard, for example Ethernet and InfiniBand standards, such as Ethernet variants 200GBASE-FR4, 400GBASE-FR4, and 100GBASE-LR4 to support four wavelengths. In this context optical connector 26 may be of type LC or FC for a 1-4 fiber split as shown in the present figures, or possibly of type MPO for larger split ratios. Electrical connectors 30a . . . 30d and their transceivers may comprise small form-factor pluggable (SFP) modules, such as type SFP or SFP+ to carry a single lane of traffic or type QSFP, QSFP-DD, or OSFP for multiple lanes. These specific types and standards are listed here only by way of example, and not limitation.

Figure 2:
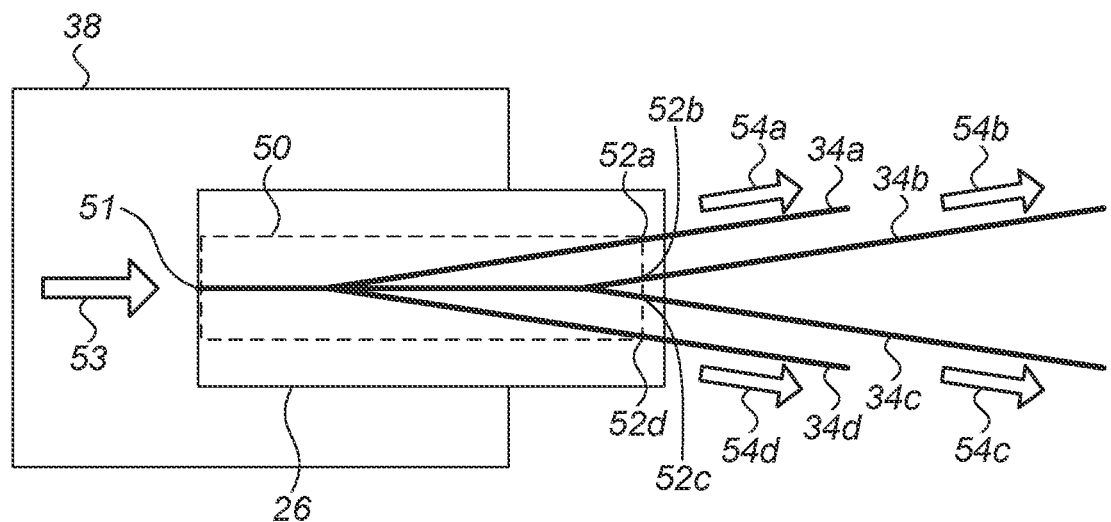
FIG. 2 is a schematic detail view of an optical connector connected to an optical receptacle and optical fibers, for use in the embodiment of FIG. 1.

FIG. 2 is a schematic detail illustration of optical connector 26 connected to optical receptacle 38 and optical fibers 28a . . . 28d, in accordance with an embodiment of the invention.

Optical connector 26 comprises a 1-to-4 optical splitter 50, which comprises, for example, a waveguide splitter, as is known in the art. Optical splitter 50 comprises an input 51 and four outputs 52a, 52b, 52c, and 52d. With reference to FIG. 1, first ends 34a . . . 34d of optical fibers 28a . . . 28d are connected to the respective outputs 52a . . . 52d. Optical connector 26 is inserted into optical receptacle 38, from which the connector receives an optical input signal 53 comprising four wavelengths $\lambda_1$, $\lambda_2$, $\lambda_3$, and $\lambda_4$. Splitter 50 divides optical input signal 53 into four optical signals 54a, 54b, 54c, and 54d, which propagate through respective outputs 52a . . . 52d into respective first ends 34a . . . 34d and further, with reference to FIG. 1, within optical fibers 28a . . . 28d. Each optical signal 54a . . . 54d comprises all four wavelengths $\lambda_1$ . . . $\lambda_4$.

Figure 3:
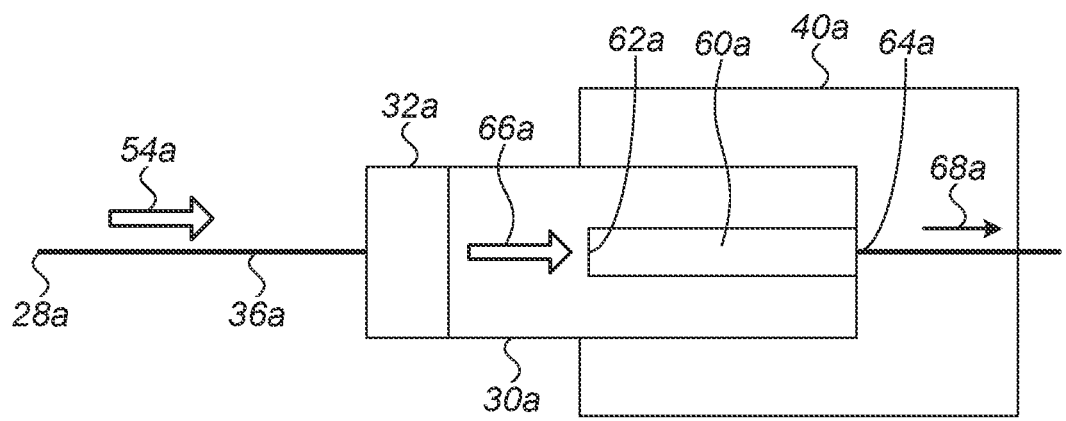
FIG. 3 is a schematic detail view of an electrical connector connected to an electrical receptacle and an optical fiber via wavelength selection optics, for use in the embodiment of FIG. 1.

FIG. 3 is a schematic detail illustration of electrical connector 30a connected to electrical receptacle 40a and optical fiber 28a via wavelength selection optics 32a, in accordance with an embodiment of the invention. Electrical connectors 30b . . . 30d are similar in structure to connector 30a, together with their connections to respective fibers 28b . . . 28d.

Electrical connector 30a comprises a transceiver 60a, comprising an optical input 62a and an electrical output 64a, such that an optical signal received at the optical input is converted to an electrical signal at the output. Transceiver 60a (as well as transceivers 60b . . . 60d, not shown in the figure) is generally selected to comply with one of the Ethernet standards described above. With reference to FIG. 1, wavelength selection optics 32a are connected to electrical connector 30a, and second end 36a of optical fiber 28a is connected to the wavelength selection optics. Wavelength selection optics 32a comprise, for example, an optical bandpass filter. Electrical connector 30a is inserted into electrical receptacle 40a.

Optical signal 54a impinges on wavelength selection optics 32, which transmits only one of the four wavelengths $\lambda_1$ . . . $\lambda_4$, for example $\lambda_1$. Thus input 62a receives an optical signal 66a that comprises only wavelength $\lambda_1$, and signal 54a with four wavelengths and a data rate of 400 Gb/s (4×100 Gb/s), has been reduced to signal 66a with one wavelength ($\Delta_1$) and a data rate of 100 Gb/s. This 100 Gb/s signal is converted by transceiver 60a into an electrical signal 68a, which exits from electrical output 64a to receptacle 40a.

By configuring the optical passbands of wavelength selecting optics 32a . . . 32d such that each wavelength selecting optics transmits a different, respective one of the four wavelengths $\lambda_1$ . . . $\lambda_4$, the four 100 Gb/s optical signals carried as 4×100 Gb/s within optical fibers 28a . . . 28d are demultiplexed to the four servers 24a . . . 24d.

Although wavelength selection optics 32a is shown in FIGS. 1 and 3 to be positioned adjacent to electrical connector 30a, they may alternatively be positioned at other locations within optical fiber 28a. For example, wavelength selection optics 32a may be positioned in optical fiber 28a part way between optical connector 26 and electrical connector 30a, such that the part of optical fiber 28a downstream from the wavelength selection optics already carries a 100 Gb/s signal at a single wavelength. Second end 36a is in this case connected directly to electrical connector 30a.

Second Embodiment

Figure 4:
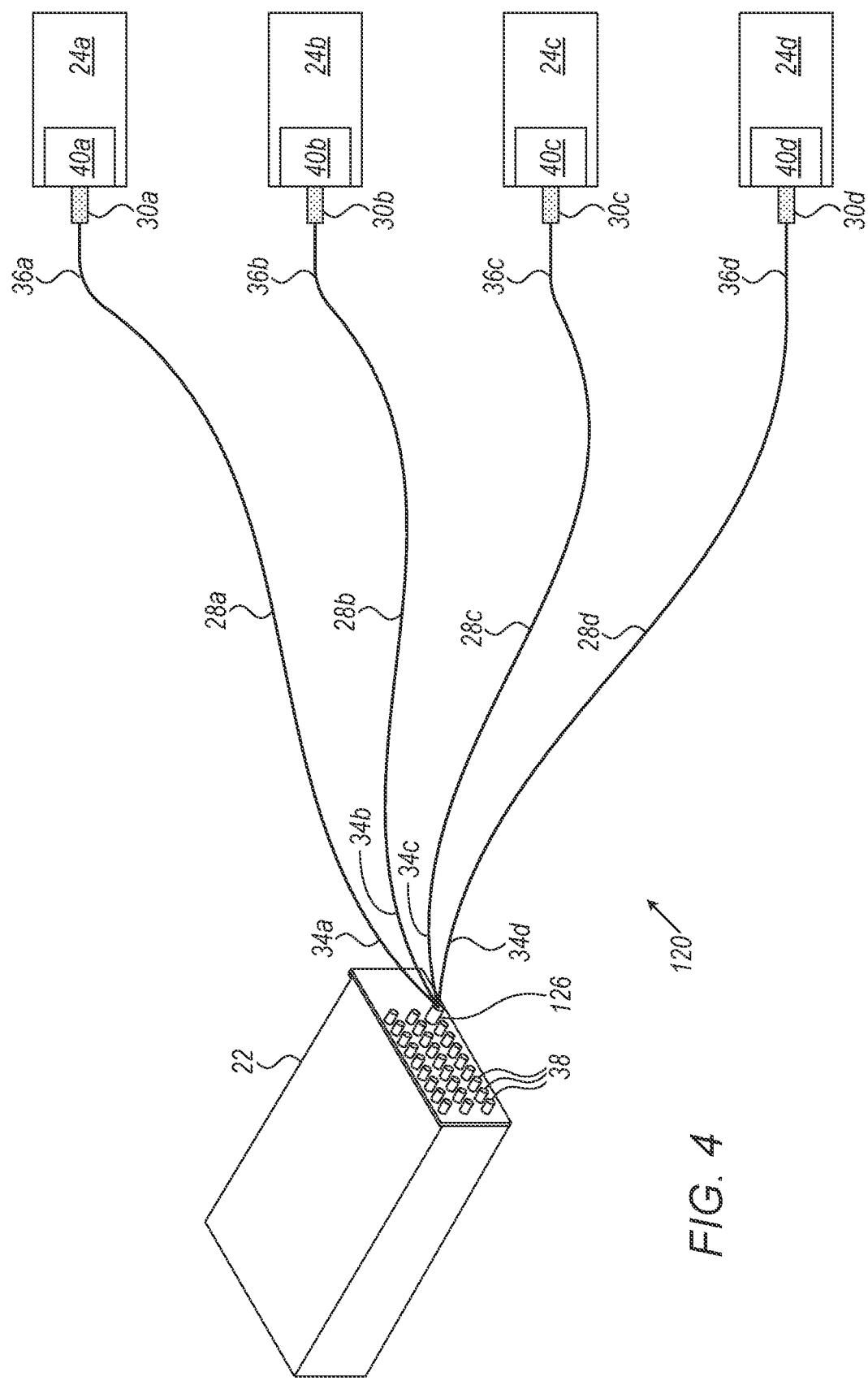
FIG. 4 is a schematic pictorial illustration of an active optical cable connecting a switch assembly to four servers, in accordance with another embodiment of the invention.

FIG. 4 is a schematic pictorial illustration of an active optical cable 120 connecting switch assembly 22 to four servers 24a, 24b, 24c, and 24d, in accordance with another embodiment of the invention.

Active optical cable 120 comprises a single optical connector 126 (detailed further in FIG. 5), and, similarly to active optical cable 20 in FIG. 1, four optical fibers 28a . . . 28d, and four electrical connectors 30a . . . 30d. Active optical cable 120 differs from active optical cable 20 in that wavelength selection takes place within optical connector 126, and therefore wavelength selection optics 32a . . . 32d have been omitted from FIG. 4. Due to the similarity to FIG. 1, the same indicator numbers are used to refer to similar items.

Figure 5:
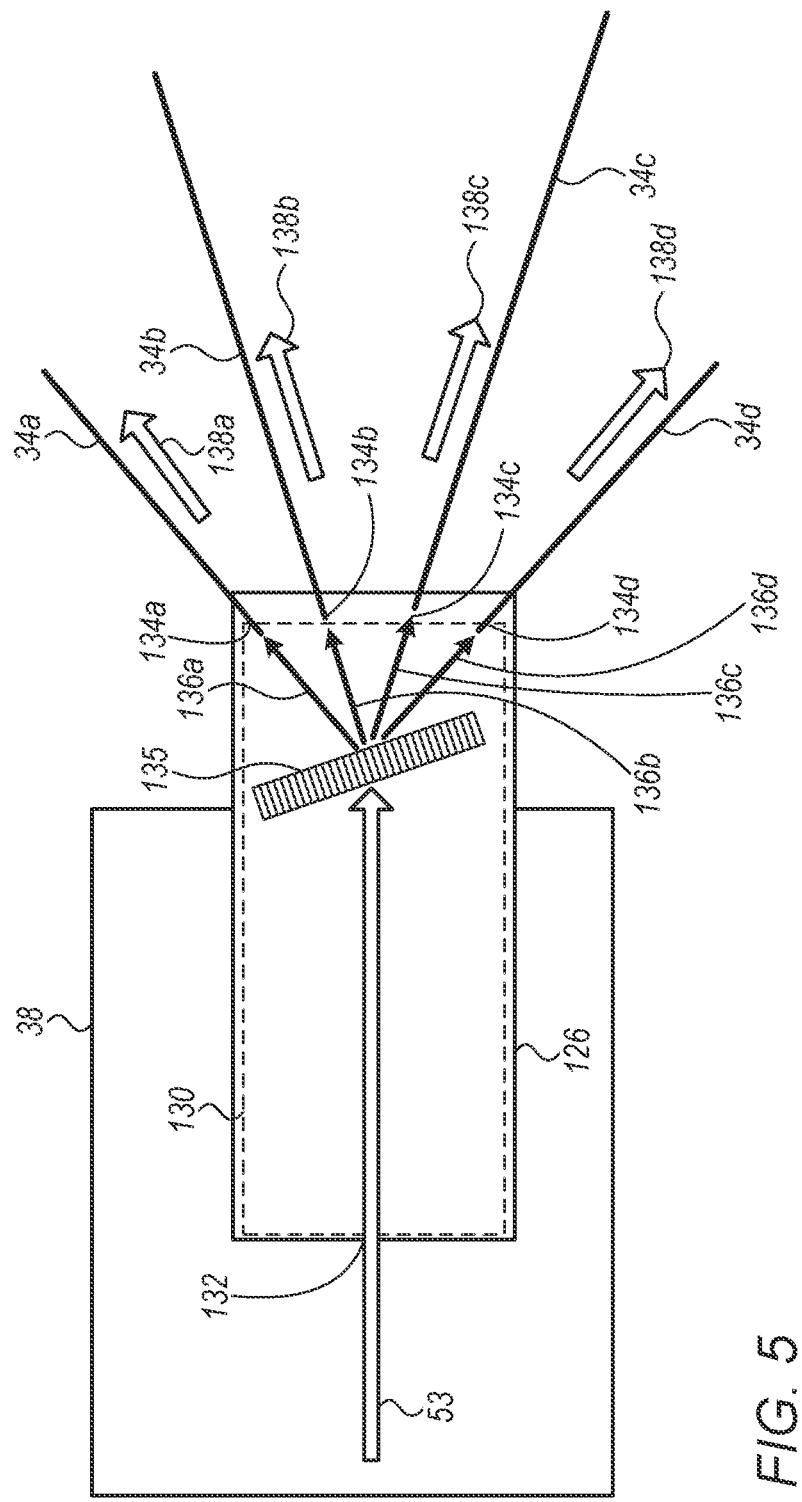
FIG. 5 is a schematic detail view of an optical connector connected to an optical receptacle and optical fibers, For use in the embodiment of FIG. 4.

FIG. 5 is a schematic detail illustration of optical connector 126 connected to optical receptacle 38 and to optical fibers 28a . . . 28d, in accordance with the embodiment of FIG. 4.

Optical connector 126 comprises wavelength selection optics 130, for example a transmission diffraction grating 135 functioning as a wavelength-division demultiplexer (a wavelength splitter). Alternatively, other sorts of wavelength splitters and filters may be used for this purpose, as are known in the art. Wavelength selection optics 130 comprise an input 132 and four outputs 134a, 134b, 134c, and 134d. With reference to FIG. 4, first ends 34a . . . 34d of optical fibers 28a . . . 28d are connected to the respective outputs 134a . . . 134d. Optical connector 126 is inserted into optical receptacle 38, from which the connector receives, similarly to FIG. 2, an optical input signal 53 comprising four wavelengths $\lambda_1 \ldots \lambda_4$.

Wavelength selection optics 130 divide optical input signal 53 into four optical signals 136a, 136b, 136c, and 1364d, which propagate through respective outputs 134a . . . 134d into respective first ends 34a . . . 34d as optical signals 138a, 138b, 138c, and 138d. As opposed to the embodiment depicted in FIGS. 1 and 2, however, due to the dispersive action of wavelength-division demultiplexer in selection optics 130, each one of optical signals 136a . . . 136d comprises only one of the four wavelengths $\lambda_1 \ldots \lambda_4$ (with each optical signal comprising a different wavelength from the others). Thus, each one of optical signals 138a . . . 138d, with reference to FIG. 4, in respective optical fibers 28a . . . 28d comprises an optical signal at a respective one of wavelengths $\lambda_1 \ldots \lambda_4$ and at a data rate of 100 Gb/s. Second ends 36a . . . 36d of optical fibers 28a . . . 28d may be connected directly to respective electrical connectors 30a . . . 30d.

Bidirectional Communications

FIG. 6 is a schematic pictorial illustration of an active optical cable 220 connecting a switch assembly 222 to four servers 224a, 224b, 224c, and 224d, in accordance with yet another embodiment of the invention.

Active optical cable 220 comprises a single optical connector 226 (detailed further in FIG. 7), four optical fiber pairs 228a, 228b, 228c, and 228d, four electrical connectors 230a, 230b, 230c, and 230d (detailed further in FIG. 8), and four wavelength selection optics 232a, 232b, 232c, and 232d. For the sake of simplicity, the details of optical fiber pairs 228a . . . 228d are shown only for pair 228a, as these details are the same for pairs 228b . . . 228d. Fiber pair 228a comprises a fiber 228ao and a fiber 228ai, wherein "o" denotes that fiber 228ao conveys an optical signal out from switch assembly 222, and "i" denotes that fiber 228ai conveys an optical signal into the switch assembly. The optical signals conveyed out of and into switch assembly 222 are schematically represented by arrows 242ao and 242ai, respectively. Fiber 228ao comprises a first end 234ao and a second end 236ao, and fiber 228ai comprises a first end 234ai and a second end 236ai, with the notations "o" and "i" defined above.

Figure 7:
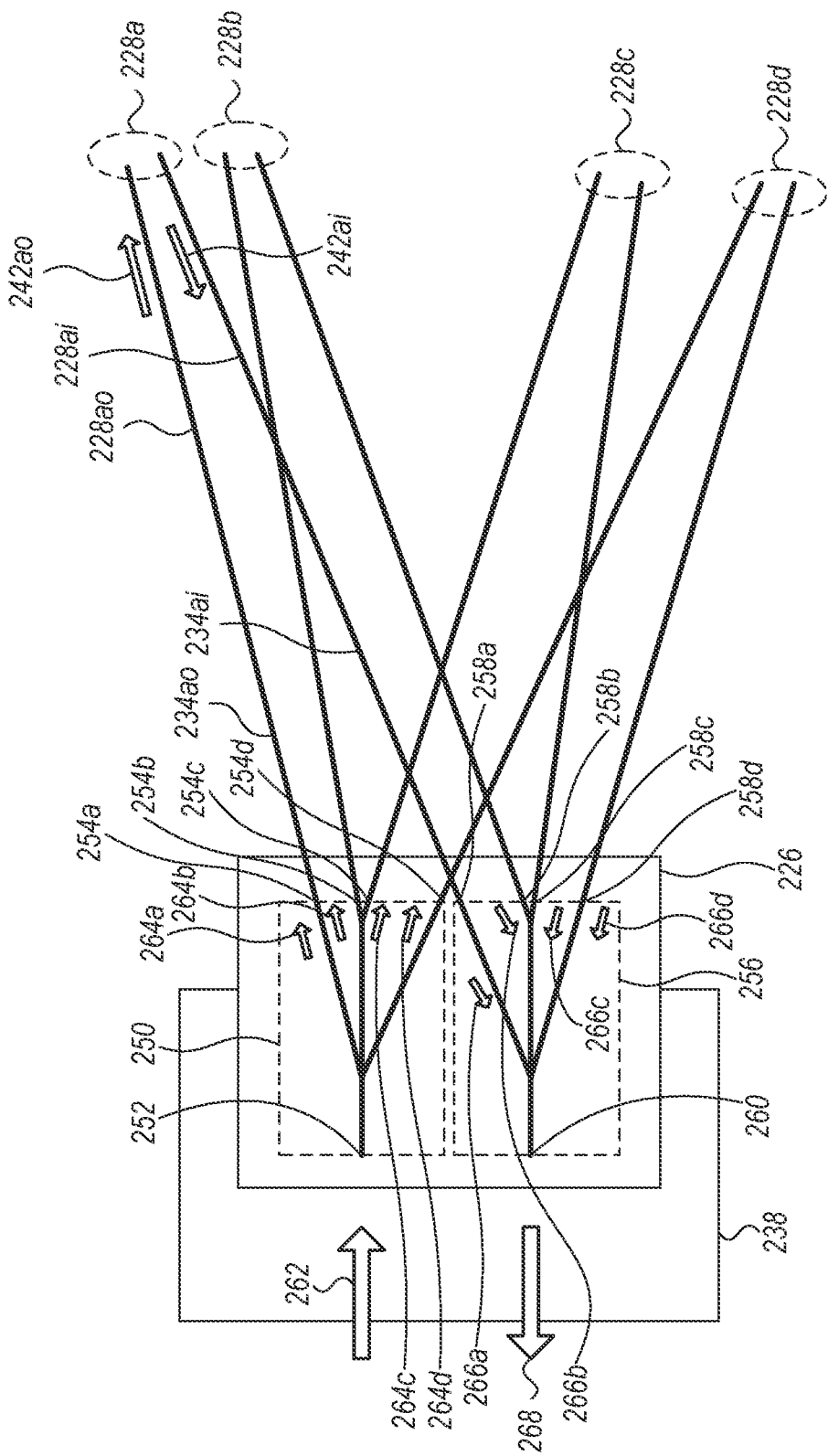
FIG. 7 is a schematic detail view of an optical connector connected to an optical receptacle and optical fiber pairs, for use in the embodiment of FIG. 6.
Figure 8:
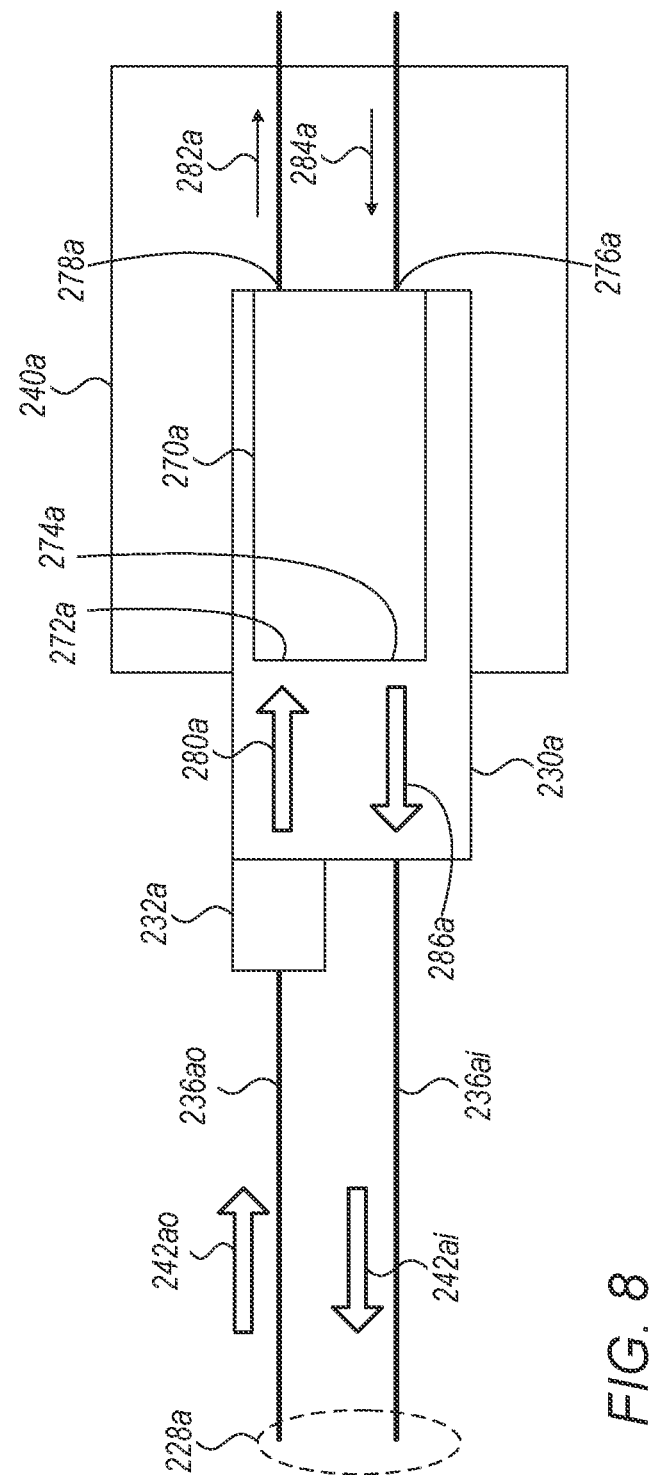
FIG. 8 is a schematic detail view of an electrical connector connected to an electrical receptacle and to second ends of an optical fiber pair, for use in the embodiment of FIG. 6.

First ends 234ao and 234ai of optical fiber pair 234a are connected to optical connector 226, and second ends 236ao and 236ai of optical fiber pair 234a are connected to electrical connector 230a, as detailed further in FIGS. 7 and 8. Similar connections are made for optical fiber pairs 234b . . . 234d, but the details are again omitted here for the sake of clarity.

Similarly to switch assembly 22 in FIGS. 1 and 4, switch assembly 222 comprises a matrix of optical receptacles 238. Each server 224a . . . 224d comprises respective electrical receptacles 240a, 240b, 240c, and 240d.

FIG. 7 is a detail schematic illustration of optical connector 226 connected to optical receptacle 238 and optical fiber pairs 228a . . . 228d, in accordance with the embodiment of FIG. 6. As in FIG. 6, details are described only for fiber pair 228a, while it is understood that similar descriptions apply also to fiber pairs 228b . . . 228d.

Optical connector 226 comprises a 1-to-4 optical splitter 250 and a 4-to-1 optical joiner 256, which comprise, for example, two waveguide splitters configured to work in opposite directions. Optical splitter 250 comprises an input 252 and four outputs 254a, 254b, 254c, and 254d. Optical joiner 256 comprises four inputs 258a, 258b, 258c, and 258d, and one output 260.

With reference to FIG. 6, first ends 234ao and 234ai of optical fiber 228a are connected to output 254a and input 258a, respectively. Optical connector 226 is inserted into optical receptacle 238, from which the connector receives a 4×100 Gb/s optical input signal 262 comprising four wavelengths $\lambda_1 \ldots \lambda_4$. Splitter 250 divides optical input signal 262 into four optical signals 264a, 264b, 264c, and 264d, wherein each of the four signals comprises all four wavelengths $\lambda_1 \ldots \lambda_4$, i.e., a 4×100 Gb/s signal. Signal 264a propagates through output 254a to couple into first end 234ao, and propagates in fiber 228ao as optical signal 242ao. Signals 264b . . . 264d are similarly coupled to respective fibers of fiber pairs 228b . . . 228d.

Signal 242ai, which, with reference to FIG. 8, is generated in electrical connector 230a, propagates in fiber 228ai into first end 234ai, from which it is coupled into input 258a, and propagates in joiner 256 as a signal 266a. Similarly, signals 266b . . . 266d arrive from respective fibers of fiber pairs 228b . . . 228d. Signals 266a . . . 266d are joined by joiner 256 into output optical signal 268, which further propagates into optical receptacle 238 of switch assembly 222.

Alternatively, optical splitter 250 may be implemented using wavelength selection optics 130 as shown in FIG. 5, in which case each of the four outgoing fiber of pairs 228a . . . 228d conveys a 100 Gb/s signal at a single wavelength. In this case, wavelength selection optics 232a . . . 232d may be omitted.

FIG. 8 is a schematic detail illustration of electrical connector 230a connected to electrical receptacle 240a and to second ends 236ao and 236ai of optical fiber pair 228a, in accordance with the embodiment of FIG. 6. Electrical connectors 230b . . . 230d and their connections to optical fiber pairs 228b . . . 228d are similar to connector 230a, but are not detailed here for the sake of brevity.

Electrical connector 230a comprises a two-way transceiver 270a. Transceiver 270a comprises an optical input 272a, an optical output 274a, an electrical input 276a, and an electrical output 278a. An optical signal impinging on optical input 272a is converted by transceiver 270a into an electrical signal emitted at electrical output 278a, and an electrical signal inserted in electrical input 276a is converted by the transceiver into an optical signal, which is emitted at optical output 274a. With reference to FIG. 6, wavelength selection optics 232a are connected to electrical connector 230a, and second end 236ao is connected to the wavelength selection optics. Electrical connector 230a is inserted into receptacle 240a of server 224a.

Optical signal 242ao, carrying the four wavelengths $\lambda_1 \ldots \lambda_4$ at a data rate of 4×100 Gb/s, enters electrical connector 230a via wavelength selection optics 232a. Wavelength selection optics 232a transmit only one of the four wavelengths, for example $\lambda_1$, into a signal 280a, which enters transceiver 270a via optical input 272a. Similarly to the embodiments illustrated in FIGS. 1 and 3, due to the filtering action of wavelength selection optics 232a, signal 280a carries a signal at a data rate of 100 Gb/s, which is converted by transceiver 270a into an electrical signal 282a, and subsequently emitted from electrical output 278a into receptacle 240a.

An electrical signal 284a emitted from server 224a through receptacle 240a enters into transceiver 270a via electrical input 276a. Transceiver 270a converts electrical signal 284a into an optical signal 286a, which is emitted by optical output 274a into second end 236ai, and subsequently propagates, with reference to FIG. 6, in fiber 228ai as optical signal 242ai. Optical signal 286a is generally emitted at the same wavelength $\lambda_1$ as optical signal 280a. Alternatively, optical signal 286a may be emitted at a wavelength $\lambda_1'$ that is different from $\lambda_1$, as long as $\lambda_1'$ is also different from the wavelengths of the respective optical signals emitted by transceivers 270b . . . 270d of optical connectors 230b . . . 230d. This difference between the wavelengths emitted by the four transceivers enables the switch to distinguish between the signals received from the different transceivers.

The optical signals emitted by transceivers 270a . . . 270d, which are, with reference to FIG. 7, subsequently received by joiner 256 via inputs 258a . . . 258d as signals 266a . . . 266d and emitted as optical signal 268, are at different wavelengths so as to be differentiable by switching assembly 222.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical cable, comprising:
   a single optical connector to receive optical signals at a plurality of different wavelengths;
   multiple electrical connectors, each electrical connector comprising a transceiver to convert the optical signals into electrical output signals;
   a plurality of optical fibers, having respective first ends connected to receive the optical signals from the single optical connector, and each of the optical fibers having a respective second end coupled to a respective one of the electrical connectors; and
   wavelength selection optics to convey the optical signals in a different, respective passband, which contains a respective one of the different wavelengths, to the transceiver in each of the electrical connectors.

2. The optical cable according to claim 1, wherein the wavelength selection optics comprise a wavelength splitter in the single optical connector, such that each of the optical fibers receives and conveys the optical signals only at the respective one of the wavelengths.

3. The optical cable according to claim 2, wherein the wavelength splitter comprises an optical wavelength-division demultiplexer.

4. The optical cable according to claim 3, wherein the optical wavelength-division demultiplexer comprises a transmission diffraction grating contained in the single optical connector.

5. The optical cable according to claim 1, wherein the wavelength selection optics comprise a wavelength selection filter associated with each of the multiple electrical connectors.

6. The optical cable according to claim 5, wherein the wavelength selection filter comprises an optical bandpass filter.

7. The optical cable according to claim 5, wherein the wavelength selection optics comprises an optical wavelength-division demultiplexer.

8. The optical cable according to claim 1, wherein the transceiver in each of the electrical connectors is further configured to convert an electrical input signal received from the electrical receptacle into a respective optical output signal, and the optical fibers comprise fiber pairs, each pair comprising a first optical fiber to convey the optical signals from the single optical connector to the respective one of the electrical connectors and a second optical fiber to convey the optical output signal from the transceiver to the single optical connector.

9. The optical cable according to claim 8, wherein each transceiver is configured to generate the respective optical output signal at a different, respective wavelength.

10. A method for producing an optical cable, comprising:
    providing an optical connector to receive optical signals at a plurality of different wavelengths;
    providing multiple electrical connectors each electrical connector comprising a transceiver to convert the optical signals into electrical output signals;
    connecting respective first ends of a plurality of optical fibers to the single optical connector so as to receive the optical signals, and connecting a respective second end of each of the optical fibers to a respective one of the electrical connectors; and
    applying wavelength selection optics to convey the optical signals in a different, respective passband, which contains a respective one of the different wavelengths, to the transceiver in each of the electrical connectors.

11. The method according to claim 10, wherein applying the wavelength selection optics comprises coupling a wavelength splitter to the single optical connector, such that each of the optical fibers receives and conveys the optical signals only at the respective one of the wavelengths.

12. The method according to claim 11, wherein the wavelength splitter comprises an optical wavelength-division demultiplexer.

13. The method according to claim 12, wherein the optical wavelength-division demultiplexer comprises a transmission diffraction grating contained in the optical connector.

14. The method according to claim 10, wherein applying the wavelength selection optics comprises coupling a wavelength selection filter to each of the multiple electrical connectors.

15. The method according to claim 14, wherein the wavelength selection filter comprises an optical bandpass filter.

16. The method according to claim 14, wherein the wavelength selection optics comprises an optical wavelength-division demultiplexer.

17. The method according to claim 10, and comprising applying the transceiver in each of the electrical connectors to convert an electrical input signal received from the electrical receptacle into a respective optical output signal, and wherein the plurality of optical fibers comprises a plurality of pairs of optical fibers, each pair comprising a first optical fiber to convey the optical signals from the single optical connector to the respective one of the electrical connectors and a second optical fiber to convey the optical output signal from the transceiver to the optical connector.

18. The method according to claim 17, wherein each transceiver generates the respective optical output signal at a different, respective wavelength.

19. A method for networking, comprising:
providing an optical cable comprising a single optical connector to receive optical signals at a plurality of different wavelengths, multiple electrical connectors, each electrical connector comprising a transceiver to convert the optical signals into electrical output signals, a plurality of optical fibers, having respective first ends connected to receive the optical signals from the single optical connector, and each of the optical fibers having a respective second end coupled to a respective one of the electrical connectors, and wavelength selection optics to convey the optical signals in a different, respective passband, which contains a respective one of the different wavelengths, to the transceiver in each of the electrical connectors;
inserting the single optical connector into an optical receptacle in a network hub; and
inserting the electrical connectors into respective electrical receptacles of multiple, different network nodes.

20. The method according to claim 19, wherein the network hub comprises a switch, and the network nodes comprise servers.

\* \* \* \* \*